(12) United States Patent
Maegawa et al.

(10) Patent No.: US 6,345,018 B1
(45) Date of Patent: Feb. 5, 2002

(54) DEMODULATION CIRCUIT FOR DEMODULATING WOBBLING SIGNAL

(75) Inventors: Hiroshi Maegawa; Toshihiro Shigemori, both of Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/633,227

(22) Filed: Aug. 4, 2000

(30) Foreign Application Priority Data

Aug. 4, 1999 (JP) .......................... 11-220648
Nov. 1, 1999 (JP) .......................... 11-310995

(51) Int. Cl.[7] .............................................. G11B 7/00
(52) U.S. Cl. .......................... 369/44.13; 369/47.19; 369/59.1; 369/59.2
(58) Field of Search ...................... 369/44.11, 44.13, 369/44.27, 44.28, 44.29, 44.34, 47.1, 47.11, 47.19, 47.2, 47.28, 47.35, 53.1, 53.44, 59.1, 59.11, 59.2

(56) References Cited

U.S. PATENT DOCUMENTS 5,748,582 A * 5/1998 Kobayashi et al. ...... 369/44.26
6,172,952 B1 * 1/2001 Inokuchi et al. ......... 369/47.55
6,201,773 B1 * 3/2001 Aoki ....................... 369/44.13

FOREIGN PATENT DOCUMENTS

| JP | 5-260413 | 10/1993 |
| JP | 6-19898 | 3/1994 |
| JP | 10-69646 | 3/1998 |

* cited by examiner

Primary Examiner—Muhammad Edun
(74) Attorney, Agent, or Firm—Dickstein Shapiro Morin & Oshinsky LLP

(57) ABSTRACT

A device for demodulating position information that is recorded as track wobbling in a record medium by a BPSK scheme includes a carrier-wave-generation circuit which derives a carrier wave from a wobbling signal obtained from the record medium, a phase-adjustment circuit which generates a phase-comparison signal having a 90° phase difference relative to the carrier wave, a multiplier which multiplies the wobbling signal and the phase-comparison signal to supply a product signal, and a detection circuit which detects a phase error of the carrier wave introduced by the carrier-wave-generation circuit by detecting the phase error between the wobbling signal and the phase-comparison signal based on the product signal.

29 Claims, 16 Drawing Sheets

FIG. 15A POSITION DATA
FIG. 15B SYNCHRONOUS-DETECTION SIGNAL
FIG. 15C INVERSION SIGNAL

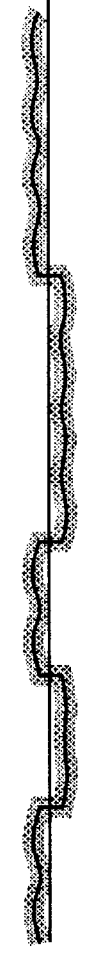
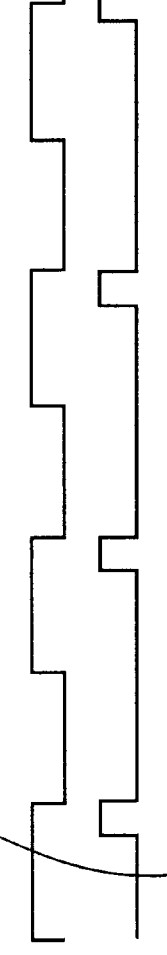
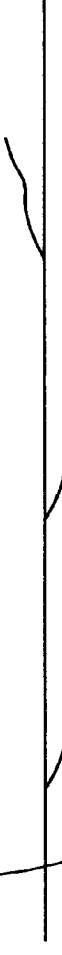
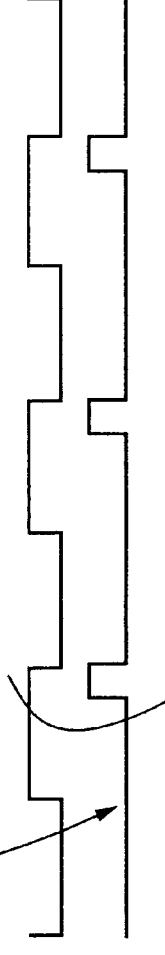
FIG. 17A PHASE MODULATION DATA
FIG. 17B PHASE MODULATED SIGNAL
FIG. 17C OUTPUT OF SYNCHRONOUS-DETECTION CIRCUIT
FIG. 17D OUTPUT OF 131
FIG. 17E INTEGRATION TIMING SIGNAL FOR 131
FIG. 17F SAMPLING TIMING SIGNAL FOR 133
FIG. 17G OUTPUT OF 132
FIG. 17H INTEGRATION TIMING SIGNAL FOR 132
FIG. 17I SAMPLING TIMING SIGNAL FOR 134
FIG. 17J PHASE-DEMODULATED SIGNAL
FIG. 17K PHASE-DEMODULATED DATA

FIG.18A PHASE MODULATION DATA

FIG.18B PHASE MODULATED SIGNAL

FIG.18C OUTPUT OF SYNCHRONOUS-DETECTION CIRCUIT

FIG.18D OUTPUT OF 131

FIG.18E INTEGRATION TIMING SIGNAL FOR 131

FIG.18F SAMPLING TIMING SIGNAL FOR 133

FIG.18G OUTPUT OF 132

FIG.18H INTEGRATION TIMING SIGNAL FOR 132

FIG.18I SAMPLING TIMING SIGNAL FOR 134

FIG.18J PHASE-DEMODULATED SIGNAL

FIG.18K PHASE-DEMODULATED DATA

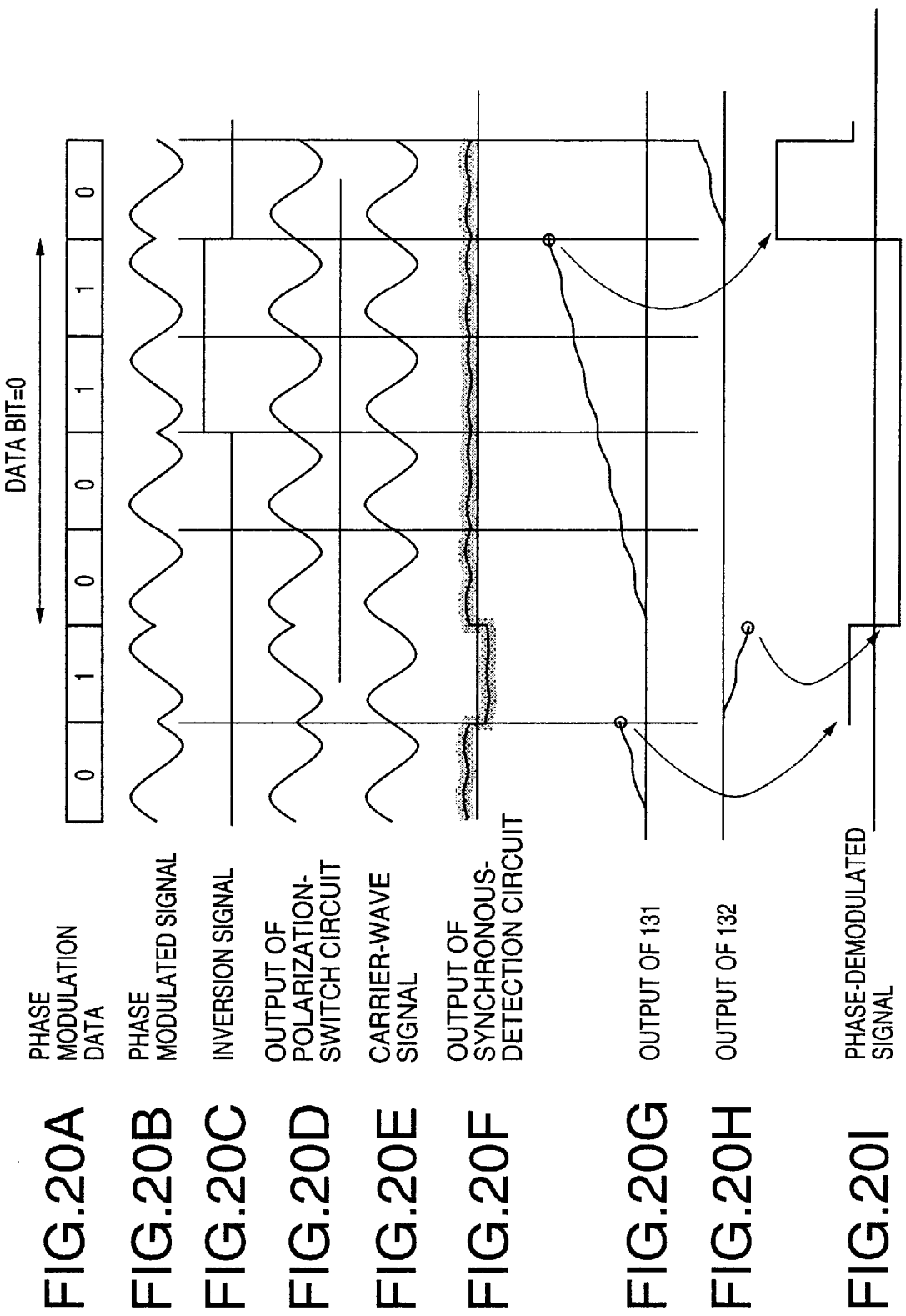

DEMODULATION CIRCUIT FOR DEMODULATING WOBBLING SIGNAL

BACKGROUND OF THE INVENTION

1. Field of the Invention

The present invention relates to a device for recording/reproducing information in/from a record medium such as a DVD-RW (digital video disk rewritable or digital versatile disk rewritable) having a wobble on a track as phase-modulated address information, and relates to a demodulator circuit used in such a device for the purpose of demodulating addresses.

2. Description of the Related Art

In general, there is a need to correctly detect a linear velocity at each radial location of a record medium. To this end, many record media employ a format in which a track is wobbled at the time of manufacturing so as to produce a constant wobble-signal frequency when a CLV (constant linear velocity) control is engaged. A device for recording/reproducing information in/from a record medium detects this wobble signal, and uses the signal for the purpose of controlling rotation of the medium and generating a record clock signal.

Address information is also necessary for the purpose of identifying a record position in a record area where no information has been recorded. In this respect, Japanese Patent Laid-open Application No. 10-69646 discloses a method of phase-modulating track wobbles. Such a phase-modulation scheme may include several different methods. In any methods, however, there is a tradeoff between the amount of recorded information and S/N (signal to noise ratio) of the detected signal. Since a signal obtained from an optical-disk medium has low quality in general, a binary phase-shift keying scheme (BPSK or DPSK: binary modulation using 0° and 180° is the most suitable because it can achieve relatively high S/N.

Demodulation circuits for demodulating this phase-modulated address information (wobbling signal) include an analog demodulator circuit disclosed in Japanese Patent No. 6-19898 and a digital demodulator circuit disclosed in Japanese Patent Laid-open Application No. 5-260413. In these circuits, a carrier wave to which the phase information of a wobbling signal is superimposed is generated from the wobbling signal by a PLL or the like, and a phase difference (0° and 180° in the case of BPSK) is detected to demodulate the information. If a phase error develops between the original carrier wave of the wobbling signal and the carrier wave generated by the PLL, quality of phase demodulation drops, resulting in frequent detection errors.

Such methods and schemes as described above are generally used in the art of cameras and the field of communication. With respect to optical disks, the following problems need to be addressed.

Optical disks produce signals having low signal quality in an area where data has been recorded. To cope with this low signal quality, a wobbling signal is generally processed by a band-pass filter or the like before it is supplied to a PLL or the like to generate a carrier wave. Since such a filter is designed to remove phase modulation components and noise components effectively, a configuration having such a filter tends to frequently develop an inadvertent phase change (phase delay). Further, when access is made to the optical-disk medium under the conditions of constant angular velocity, the carrier-wave frequency of the wobbling signal varies depending on radial positions, so that the phase change (phase delay) caused by the filter as described above is easy to develop. Such a phase change serves as a phase error between the original carrier wave of the wobbling signal and the generated carrier wave, thereby resulting in deterioration of detection accuracy.

Accordingly, there is a need for a demodulation circuit, which can carry out accurate demodulation by properly detecting and correcting a phase error, and a need for a device for recording/reproducing information based on such a demodulation circuit.

Further, when address data is recorded by frequency modulating track wobbles, a carrier frequency of 22.05 kHz with a frequency shift of ±1 kHz is used to represent 0 and 1 of the data.

As previously described, Japanese Patent Laid-open Application No. 10-69646 discloses a method of phase-modulating track wobbles. Since a signal obtained from an optical-disk medium has low quality in general, a binary phase modulation scheme (BPSK or DPSK: binary modulation using 0° and 180°) is most suitable because it can achieve relatively high S/N. This modulation scheme is employed in a system requiring a high S/N, so that more than one carrier-wave cycle is used to represent 1-bit data.

As a demodulation scheme, a scheme disclosed in Japanese Patent No. 6-19898 may be used, which teaches a demodulation device that extracts a carrier signal from a phase-modulated signal, and compares phases between the phase-modulated signal and the carrier signal to demodulate the modulated data. Alternatively, a typical phase-demodulation method that may be found in a text book may be used. A BPSK scheme, however, has a drawback in that the amount of information per unit time is smaller in comparison with the QPSK scheme or the like.

Address information on an optical disk is comprised of a synchronization signal representing a reference position of data and a data signal. It is generally desirable to be able to detect the synchronization signal without a need for special processing. Because of this reason, in a phase-modulation scheme, the synchronization signal is defined simply as a predetermined carrier-wave period that has a reversed phase relative to the carrier-wave signal. In order not to reduce the amount of information to be communicated, a carrier-wave period for the synchronization signal is desirably as short as possible.

The utmost requirement is that the data signal be able to be distinguished from the synchronization signal. Further, there is a need to avoid reducing the amount of information communicated via data signals when the data signals are provided in larger numbers than the synchronization signals. In consideration of the above, it is desirable that the data signals do not include a reversed-phase carrier-wave period longer than the synchronization signal, and rather include a shorter period of reversed phase.

When a phase is reversed during a short time period, however, a detected signal tends to have a relatively small signal level and become noisy, thereby more likely to generate errors.

Accordingly, there is a need for a demodulation circuit that can correctly demodulate data signals when phase reversal is applied to short carrier-wave periods, and a need for an information-recording/reproducing device based on such a demodulation circuit.

Moreover, the BPSK scheme has a problem in that the amount of information that can be communicated is small. To increase the efficiency as much as possible, the phase of a signal may be changed carrier-wave cycle by carrier-wave cycle. In this case, however, a related-art demodulation circuit may not have a sufficient demodulation capacity to cope with speed of such phase changes. Accordingly, there is a need for a demodulation circuit that can correctly demodulate signals, and a need for an information-recording/reproducing device based on such a demodulation circuit.

SUMMARY OF THE INVENTION

Accordingly, it is a general object of the present invention to provide a demodulation device and an information recording/reproducing device that can satisfy one or more of the shortcomings of the related art.

It is another and more specific object of the present invention to provide a demodulation device and an information recording/reproducing device that can carry out accurate demodulation by properly detecting and correcting a phase error.

It is yet another object of the present invention to provide a demodulation device and an information recording/reproducing device that can correctly demodulate data signals when phase reversal is applied to short carrier-wave periods.

It is yet another object of the present invention to provide a demodulation device and an information recording/reproducing device that can correctly demodulate signals.

In order to achieve some of the above objects, a device for demodulating position information that is recorded as track wobbling in a record medium by a BPSK (binary phase-shift keying) scheme includes a carrier-wave-generation circuit which derives a carrier wave from a wobbling signal obtained from the record medium, a phase-adjustment circuit which generates a phase-comparison signal having a 90° phase difference relative to the carrier wave, a multiplier which multiplies the wobbling signal and the phase-comparison signal to supply a product signal, and a detection circuit which detects a phase error of the carrier wave introduced by the carrier-wave-generation circuit by detecting the phase error between the wobbling signal and the phase-comparison signal based on the product signal.

In the device described above, since the phase error is detected from the product of the wobbling signal and the phase-comparison signal having the 90° phase difference relative to the carrier wave, the phase error between the carrier wave and the wobbling signal can be checked when such an error develops between the carrier-wave-detection system and the wobbling-signal-detection system in response to a frequency change or the like. Such a device is easy to implement especially when digital circuits are used.

According to one aspect of the present invention, the device as described above is such that the detection circuit includes a low-frequency-band-detection circuit which detects low-frequency components of the product signal to detect the phase error between the wobbling signal and the phase-comparison signal.

In the device described above, the phase error is detected by detecting low-frequency components of the product of the wobbling signal and the phase-comparison signal, so that a simple circuit configuration can perform the required task.

According to another aspect of the present invention, the device as described above is such that the detection circuit includes an integrator circuit which integrates the product signal over a time period to detect the phase error between the wobbling signal and the phase-comparison signal.

In the device described above, the phase error is detected by integrating the product of the wobbling signal and the phase-comparison signal, so that a simple circuit configuration can perform the required task, and can produce highly accurate detection results.

According to another aspect of the present invention, the device further includes an amplitude-detection circuit which detects an amplitude of the wobbling signal, and an amplitude-adjustment circuit which adjusts an amplitude of the phase-comparison signal according to the detected amplitude of the wobbling signal so as to attain a target amplitude.

In the device described above, stable phase-error detection can be made without use of an AGC circuit that serves to keep constant the amplitude of the wobbling signal.

According to another aspect of the present invention, the device described above is such that the phase-adjustment circuit adjusts the phase error to zero.

In the device described above, since phases are controlled such as to make the phase error zero, automatic tracking is achieved to track a difference in delay times between the wobbling signal and the carrier wave.

According to another aspect of the present invention, a device for demodulating position information that is recorded as track wobbling in a record medium by a BPSK scheme includes a carrier-wave-generation circuit which derives a carrier wave from a wobbling signal obtained from the record medium, a phase-adjustment circuit which generates a phase-comparison signal having no phase difference relative to the carrier wave, a subtraction circuit which obtains a difference between the wobbling signal and the phase-comparison signal to supply a difference signal, and a detection circuit which detects a phase error of the carrier wave introduced by the carrier-wave-generation circuit by detecting the phase error between the wobbling signal and the phase-comparison signal based the difference signal.

In the device described above, the phase error is detected by obtaining a difference between the wobbling signal and the phase-comparison signal that has the same phase as the carrier-wave signal, so that the phase error between the carrier wave and the wobbling signal can be checked when such an error develops between the carrier-wave-detection system and the wobbling-signal-detection system in response to a frequency change or the like. Further, there is no need for a circuit that generates a signal having a 90° phase difference relative to the carrier wave, thereby avoiding an excessively large circuit structure because such a circuit is quite bulky when implemented as an analog circuit.

According to another aspect of the present invention, a device for demodulating position information that is recorded as track wobbling in a record medium by a BPSK scheme wherein a wobbling signal obtained from the record medium has a unit information thereof represented by a pair of a pre-phase-change portion and a post-phase-change portion, includes a carrier-wave-generation circuit which derives a carrier wave from the wobbling signal, an inversion-signal-generation circuit which generates an inversion signal indicative of a timing of a predetermined one of the pre-phase-change portion and the post-phase-change portion, a polarization-switch circuit which reverses a phase of the wobbling signal at the timing indicated by the inversion signal to generate a partially phase reversed wobbling signal, a synchronous-detection circuit which demodulates the partially phase reversed wobbling signal by comparing phases between the carrier wave and the partially phase reversed wobbling signal; and a data-demodulation circuit which demodulates the position information from an output of the synchronous-detection circuit.

In the device described above, the polarization of the wobbling signal is inverted for a predetermined portion of the unit information that has an opposite phase to the other portion of the unit information, so that the demodulation circuit is required to achieve less vigorous standards in terms of circuit speed for detecting phase changes, robustness against noise caused by synchronous detection around a phase change point, a capability to cope with a decrease in the output signal magnitude, etc. Therefore, a reliable demodulation circuit can be implemented by a simple circuit structure.

According to another aspect of the present invention, a device for demodulating position information that is recorded as track wobbling in a record medium by a BPSK scheme includes a carrier-wave-generation circuit which derives a carrier wave from a wobbling signal obtained from the record medium, a synchronous-detection circuit which demodulates the wobbling signal by comparing phases between the carrier wave and the wobbling signal, a plurality of integrator circuits which integrate an output of the synchronous-detection circuit over respective predetermined time periods, at least one sampling circuit which samples outputs of the integrator circuits successively, and a data-demodulation circuit which demodulates the position information from an output of said at least one sampling circuit.

In the device described above, the plurality of integrator circuits together with the sampling circuit operate in turn to continuously integrate and sample the results of phase comparison, which is made between the phase-modulated signal and the carrier-wave signal, thereby generating phase-demodulated data. This configuration makes it possible to detect the phase-modulation data under desirable conditions of S/N ratios, and, also, enables the integrator circuits to secure a sufficient discharge time.

According to another aspect of the present invention, the device as described above is such that the respective predetermined time periods are a multiple of one cycle of the carrier wave, and are variable.

In the device described above, reliable demodulation can be achieved by changing the periods of integration and the sampling timings depending on formats or types of information in a case such as when the number of carrier-wave cycles differs between the synchronization signal and the data signal.

Other objects and further features of the present invention will be apparent from the following detailed description when read in conjunction with the accompanying drawings.

BRIEF DESCRIPTION OF THE DRAWINGS

FIGS. 17A through 17K are charts showing signal waveforms according to the second embodiment of the second principle;

FIGS. 18A through 18K are charts showing signal waveforms according to a variation of the second embodiment of the second principle;

FIGS. 20A through 20I are charts showing signal waveforms for explaining the third embodiment of the second principle of the present invention.

DESCRIPTION OF THE PREFERRED EMBODIMENTS

In the following, embodiments of the present invention will be described with reference to the accompanying drawings.

Figure 1:
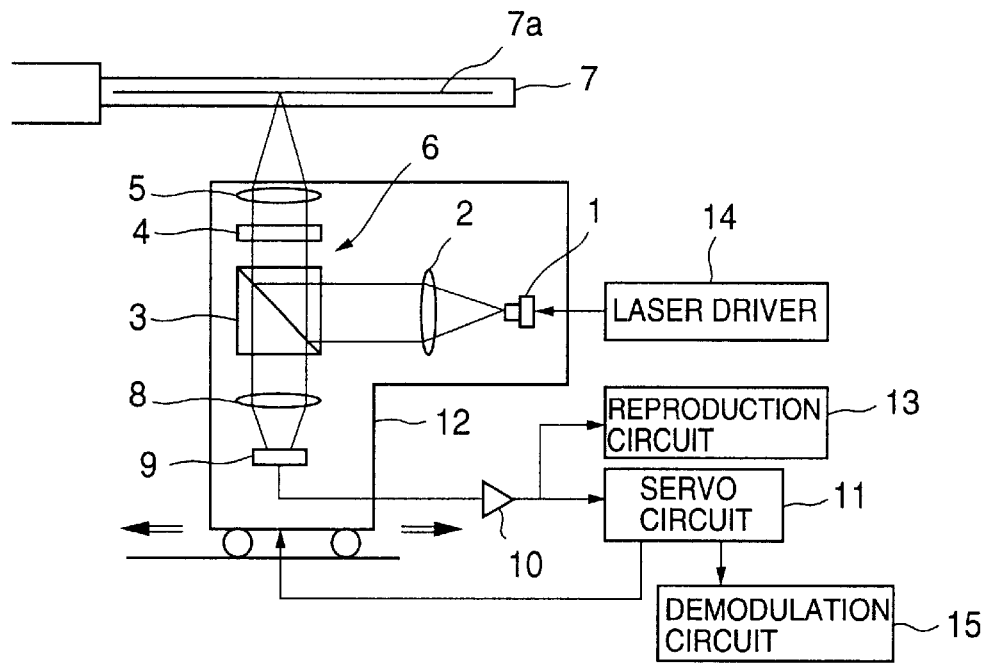
FIG. 1 is an illustrative drawing showing a general configuration of an optical disk device serving as an information recording/reproducing device of the present invention.

FIG. 1 is an illustrative drawing showing a general configuration of an optical disk device serving as an information recording/reproducing device of the present invention.

A light beam emitted from a light source 1 such as a semiconductor laser or the like is focused on a record surface 7a of a medium 7 by an optical system 6, which includes a coupling lens 2, a beam splitter 3, a ¼ wave plate 4, and an objective lens 5. Light reflected by the record surface 7a returns to the optical system 6, and passes through the beam splitter 3, followed by being focused on a light reception device 9 by a lens 8. An output of the light reception device 9 is typically converted from an electrical current to an electrical voltage by an I/V amplifier 10 before various processing is applied. It is possible, however, to process electrical current signals without converting them into voltage signals.

In general, the light reception device 9 and the I/V amplifier 10 are divided into a plurality of sections, in which various processing is carried out, such as processing of a focus error signal representing a distance between the medium surface and the light-beam focus point, processing of a track-error signal representing relative positions of a track on the medium and the light-beam spot, and processing of a RF signal for obtaining information recorded on the record surface 7a of the medium 7. In FIG. 1, the focus error signal and the track error signal are processed by a servo circuit 11, and a drive mechanism 12 is driven based on the position data to move the light-beam spot to an intended target. Information obtained from the record surface 7a of the medium 7 is processed by a reproduction circuit 13, and, then, is sent to a signal processing section provided at a subsequent stage. In FIG. 1, a laser driver 14 is provided for the purpose of driving the light source 1.

A wobbling signal used in the embodiments of the present invention will be described simply as being obtained from a reproduced signal since how to obtain the wobbling signal differs depending on the way the light-reception device 9 is divided. For example, the simplest example would be a configuration in which a wobbling signal is derived from a push-pull signal (one of the track error signals) that is obtained from a difference between the left-hand side and the right-hand side of the light-reception device divided along a track extension. The following description will be provided by taking as an example a configuration in which a demodulation circuit 15 operates based on a push-pull signal supplied from the servo circuit 11. It should be noted that the demodulation circuit 15 will characteristically differ from embodiment to embodiment.

In order to extract phase-modulated components from a wobbling signal obtained from the optical system 6, it is necessary to generate a carrier wave that has the same frequency and the same phase as the wobbling signal that has no phase modulation.

Figure 2:
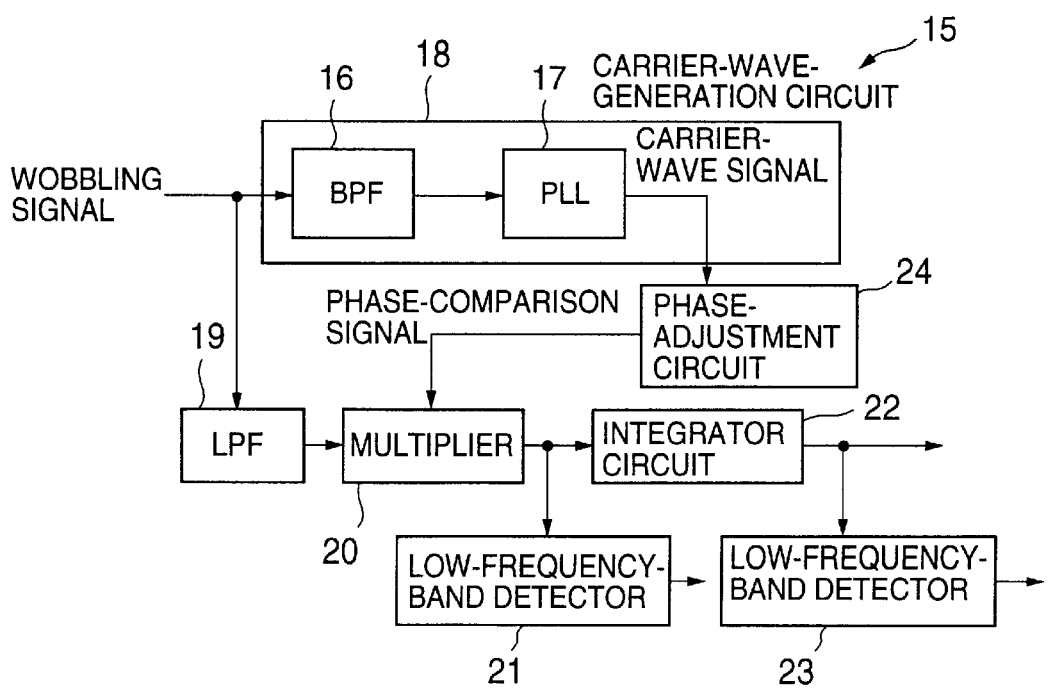
FIG. 2 is a block diagram of a demodulation circuit of FIG. 1 according to a first embodiment of a first principle of the present invention.

FIG. 2 is a block diagram of the demodulation circuit 15 according to a first embodiment of a first principle of the present invention. FIGS. 3A through 3E are charts showing signal waveforms relating to demodulation operation.

A carrier-wave-generation circuit 18 is used to generate a carrier-wave signal, and includes a bandpass filter 16 for removing phase-modulation components and noise components from the wobbling signal and a PLL (phase locked loop) 17 for generating a stable signal. The carrier-wave signal generated by the carrier-wave-generation circuit 18 has the same frequency as the wobbling signal, and, also, has a stable phase. The wobbling signal is also supplied to a low-pass filter 19, and, then, is multiplied by the carrier-wave signal by a multiplier 20. An output of the multiplier 20 is supplied to a low-frequency-band detector 21 as well as to an integrator 22, with an output of the integrator 22 being supplied to another low-frequency-band detector 23. This configuration produces phase-modulation information that is used for detecting phase shifts.

FIGS. 3B through 3E show the phase-modulated wobbling signal, the carrier-wave signal, the output of the multiplier 20, and the output of the low-frequency-band detector 21. As can be seen from comparison of the phase modulation data shown in FIG. 3A with the output of the low-frequency-band detector 21, the output of the low-frequency-band detector 21 correctly reproduces the phase modulation. This is the basics of the phase-demodulation operation.

In addition to the basics of the phase-demodulation operation, characteristic features of the present invention will be described in the following.

In this embodiment, a phase-adjustment circuit 24 is provided for the purpose of detecting a phase error between the wobbling signal and the carrier-wave signal generated by the carrier-wave-generation circuit 18. The band-pass filter 16 for removing phase-modulation components and noise components tends to introduce an inadvertent phase error (i.e., phase delay) depending on frequencies. This results in an improper phase difference between the carrier-wave signal generated from the output of the band-pass filter 16 and the wobbling signal coming out of the low-pass filter 19 having a little phase delay.

To cope with this situation, the phase-adjustment circuit 24 generates a phase-comparison signal having a 90° phase difference relative to the carrier-wave signal. Assuming that the carrier-wave signal is a sine wave, the phase-comparison signal is a cosine wave. The phase-adjustment circuit 24 may be designed as part of the PLL 17 because such a configuration is easier to design if the phase-adjustment circuit 24 is implemented as an analog circuit. The phase-comparison signal is multiplied by the wobbling signal by the multiplier 20 as the wobbling signal is supplied from the low-pass filter 19. A product of the multiplication is a signal that varies depending on □ where a phase difference between the two signals is represented as 90°+□. Here, the phase error □ is the same as the phase error between the generated carrier-wave signal and the wobbling signal.

Figure 4:
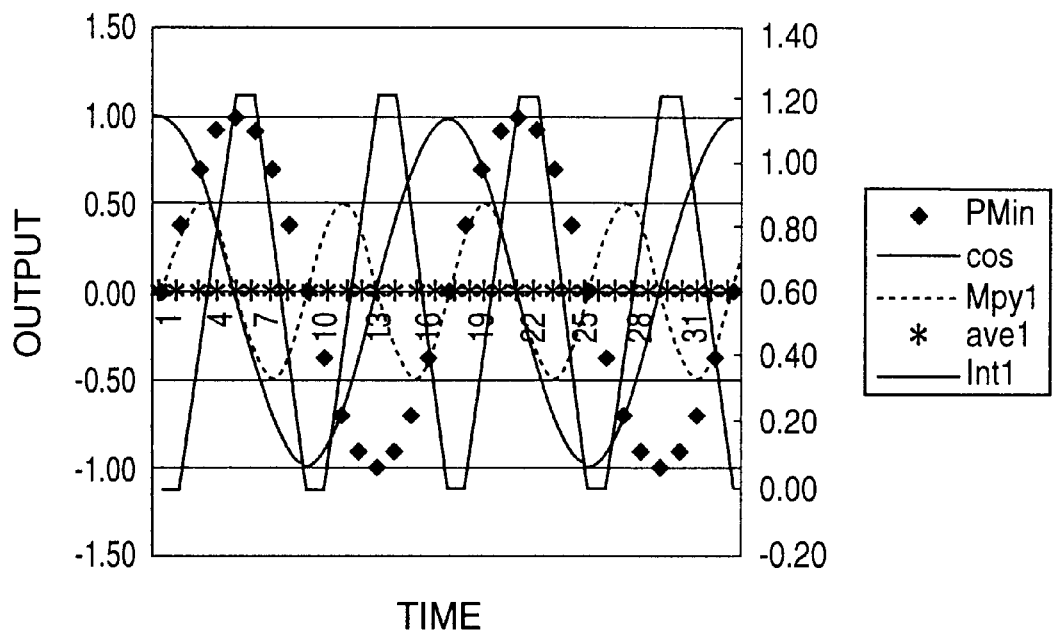
FIG. 4 is a chart showing signal waveforms where no phase error is present.
Figure 5:
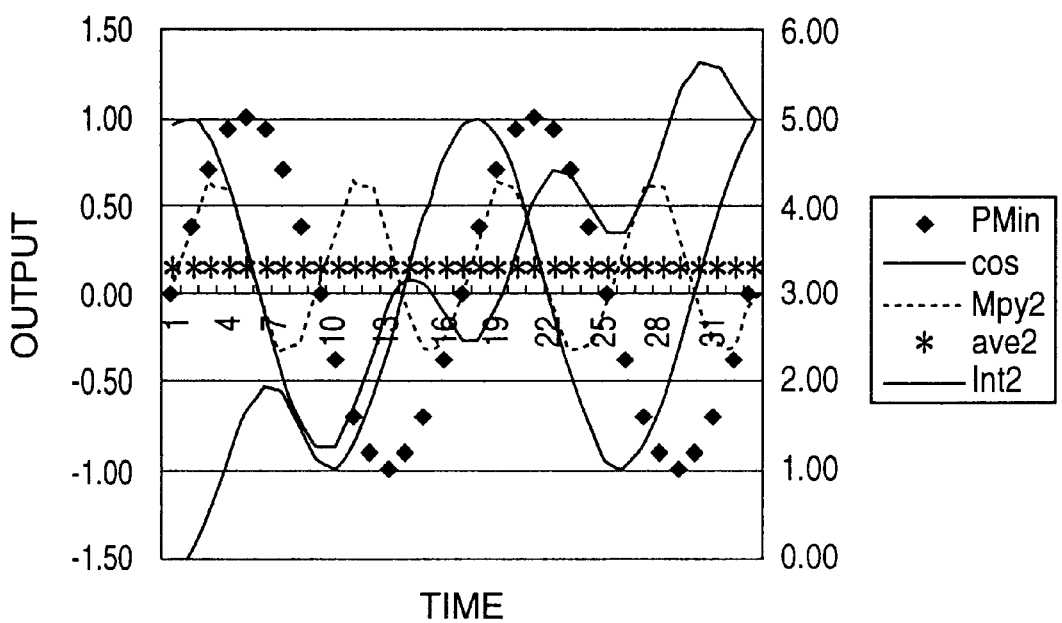
FIG. 5 is a chart showing signal waveforms where a phase error is present.

FIG. 4 is a chart showing signal waveforms where no phase error is present. FIG. 5 is a chart showing signal waveforms where a phase error is present.

In these figures, symbols are represented as:
Pmin: wobbling signal after LPF (left ordinate);
cos: phase-comparison signal (left ordinate);
Mpy1/Mpy2: output of the multiplier (left ordinate);
ave1/ave2: low-frequency components of Mpy1/Mpy2 (left ordinate); and
Int1/Int2: integration of Mpy1/Mpy2 (right ordinate).

Where no phase error is present as shown in FIG. 4, the wobbling signal after the LPF (low-pass filter) operation has a 90° phase difference relative to the phase-comparison signal. Because of this, the low-frequency component ave1 stays at a zero level, and the integration Int1 goes up and down around a constant level. Where a phase error is present as shown in FIG. 5, however, the low-frequency component ave2 stays at a certain positive level, and, thus, the integration Int2 exhibits a gradual increase. If the phase error is given in an opposite direction, the low-frequency component ave stays at a negative level, and the integration Int exhibits a general decrease. Here, the low-frequency component ave is detected by the low-frequency-band detector 21, which may be a low-pass filter for detecting low-frequency components of the output of the multiplier 20. The integration Int is detected by the integrator 22 that integrates the output of the multiplier 20. Use of the low-frequency-band detector 23 that detects low-frequency components of the output of the integrator 22 is also effective.

The phase-adjustment circuit 24 attends to fine adjustment of the phase-comparison signal such that the detected phase error becomes zero. Namely, the phase-adjustment circuit 24 adjusts the phase of the output thereof such that the detected phase error becomes zero, thereby achieving a system that can automatically follow a dynamically changing phase difference between the wobbling signal and the carrier-wave signal.

Figure 6:
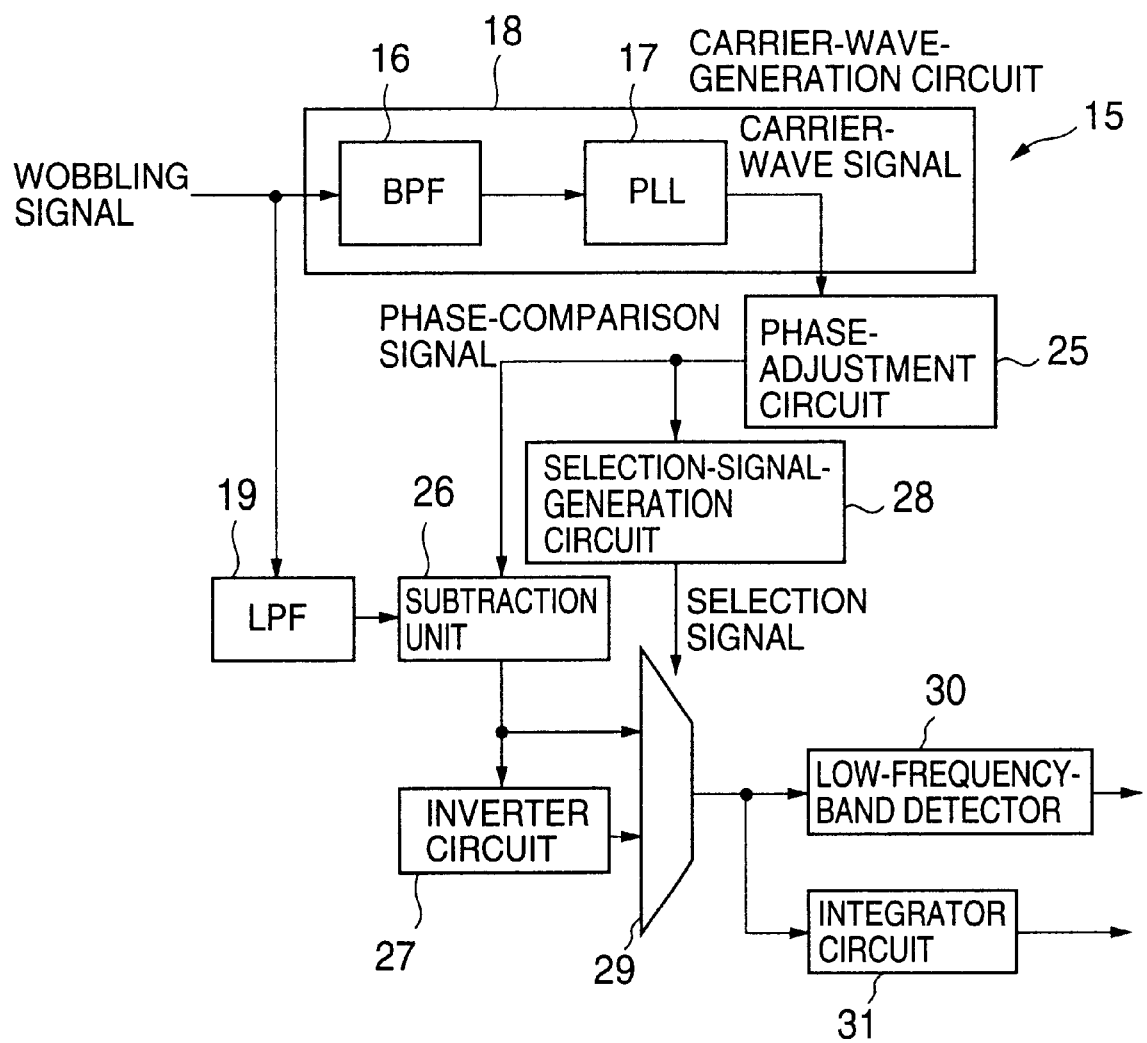
FIG. 6 is a block diagram of the demodulation circuit according to a second embodiment of a first principle of the present invention.

In the following, an information-recording/reproducing device according to a second embodiment of the first principle of the present invention will be described with reference to FIG. 6 through FIG. 8. In these figures, the same elements as those of the first embodiment are shown by the same reference numerals, and a description thereof will be omitted.

In the second embodiment, a phase-adjustment circuit 25 is provided for the purpose of attending to fine adjustment of the carrier-wave signal generated by the carrier-wave-generation circuit 18 so as to supply a phase-comparison signal centering at a zero phase difference relative to the carrier-wave signal. Namely, assuming the carrier-wave signal is a sine wave, the phase-comparison is also a sine wave.

In order to detect a phase error, a difference between the wobbling signal passing through the low-pass filter 19 and the phase-comparison signal is obtained by a subtraction unit 26. An output of the subtraction unit 26 is inverted by an inverter circuit 27. A selection-signal-generation circuit 28 generates a selection signal indicative of a period between 90° and 270° based on the phase-comparison signal (i.e., indicative of a period during which the phase-comparison signal has a negative slope), and supplies the phase-comparison signal to a selector 29 (or a switch). Here, the selection signal is a signal derived from binarizing a cosine wave. In the case of the switch, the output of the subtraction unit 26 is switched on or off depending on the selection signal. In the case of the selector 29, switching between the output of the subtraction unit 26 and the output of the inverter circuit 27 is made according to the selection signal. An output of the selector 29 (or the switch) is a signal that indicates a phase error □ between the carrier-wave signal and the wobbling signal. A low-frequency-band detector 30 and an integrator 31 are used at a subsequent stage for the purpose of obtaining signal levels indicative of the phase error.

Figure 7:
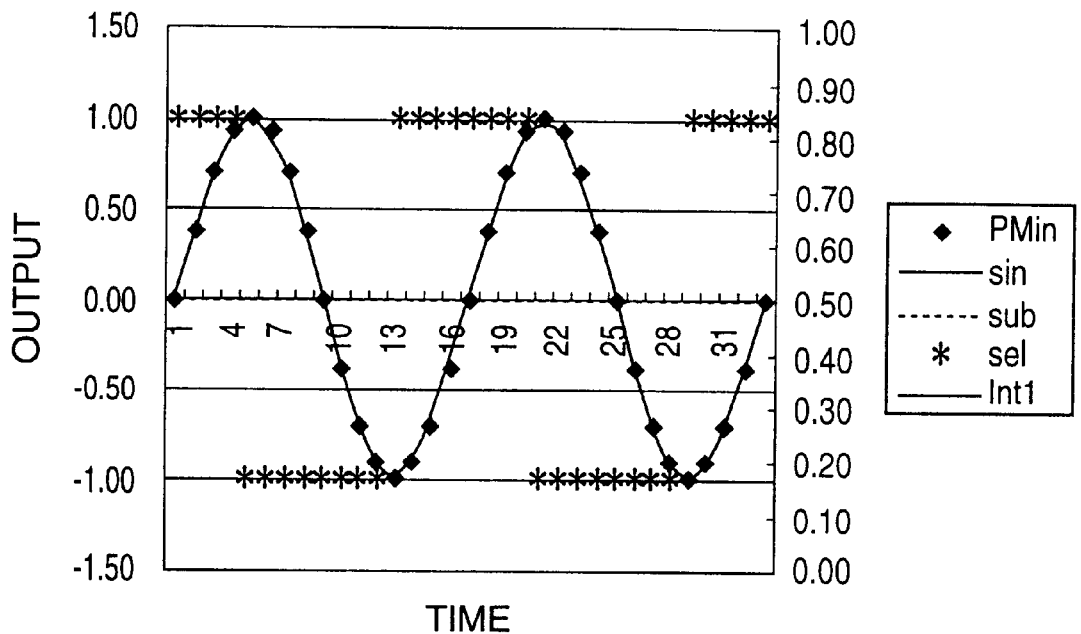
FIG. 7 is a chart showing signal waveforms where no phase error is present.
Figure 8:
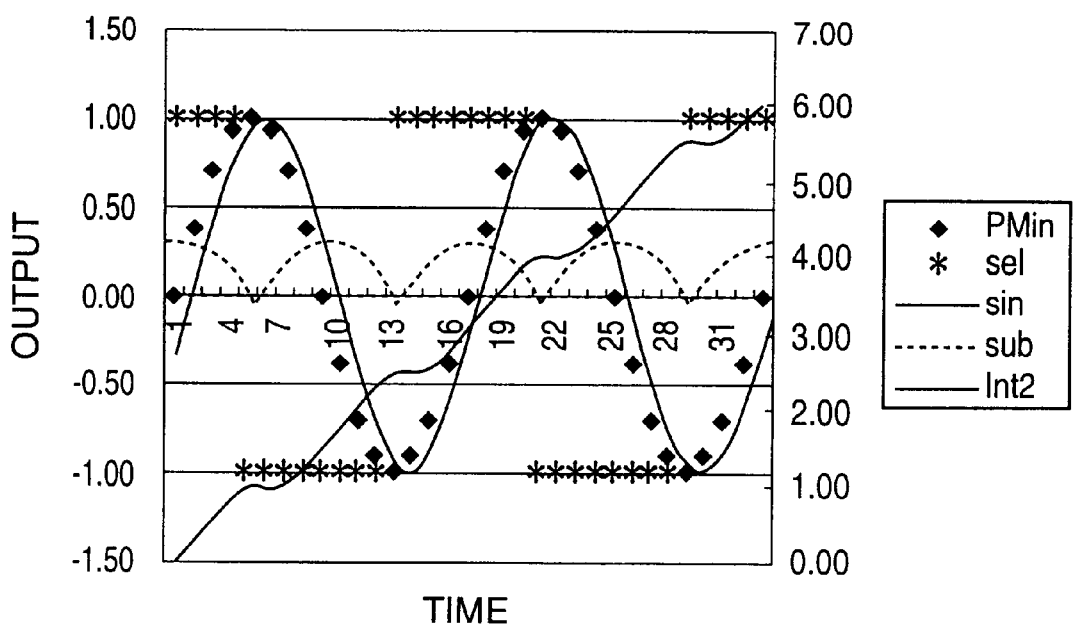
FIG. 8 is a chart showing signal waveforms where a phase error is present.

FIG. 7 is a chart showing signal waveforms where no phase error is present. FIG. 8 is a chart showing signal waveforms where a phase error is present.

In these figures, symbols are represented as:

Pmin: wobbling signal after LPF (left ordinate);

sin: phase-comparison signal (left ordinate);

sub: output of the selector (left ordinate);

sel: selection signal (high or low); and

Int1/Int2: integration of the output of the selector (right ordinate).

Where no phase error is present as shown in FIG. 7, the selector output sub and the integration Int are both zeros. Where a phase error is present as shown in FIG. 8, the output of the subtraction unit 26 becomes negative between 90° and 270° of the phase-comparison signal, and becomes positive between 0° and 90° as well as between 270° and 360° (there are cases in which a relation opposite to this is observed). Based on the selection signal, the output of the inverter circuit 27 is selected between 90° and 270° of the phase-comparison signal so that the negative output is converted into the positive output, and the output of the subtraction unit 26 is selected between 0° and 90° as well as between 270° and 360°. The selected signal is supplied to the circuits provided at the subsequent stage. If the switch is used in place of the selector 29, phase comparison is effective only during half the entire period, so that the signal level becomes half as large compared to when the selector 29 is used. At the subsequent stage, the low-frequency-band detector 30 is used for detecting low-frequency components of the signal sub, and the integrator 31 is used for the purpose of detecting the integration signal Int.

In the following, a third embodiment of the first principle of the present invention will be described with reference to FIG. 9.

As described above, detection of a phase error relies on detection of the output level of the multiplier 20 or the subtraction unit 26, and this output level varies depending on the magnitude of the wobbling signal and the magnitude of the phase-comparison signal. In general, the carrier wave is controlled to a constant magnitude. The wobbling signal, on the other hand, is a signal derived from the medium 7, and includes a magnitude variation. In consideration of this, an AGC circuit or the like for controlling the wobbling signal to a constant magnitude may be installed at a stage prior to the demodulation circuit 15. Alternatively, the signal after the low-pass filtering processing may be controlled to a constant level in order to suppress amplitude fluctuation in the signal passing through the low-pass filter 19.

Alternatively, the amplitude of the wobbling signal is detected with an aim of changing the amplitude of the phase-comparison signal. When digital circuits are used, this scheme is easy to implement.

Figure 9:
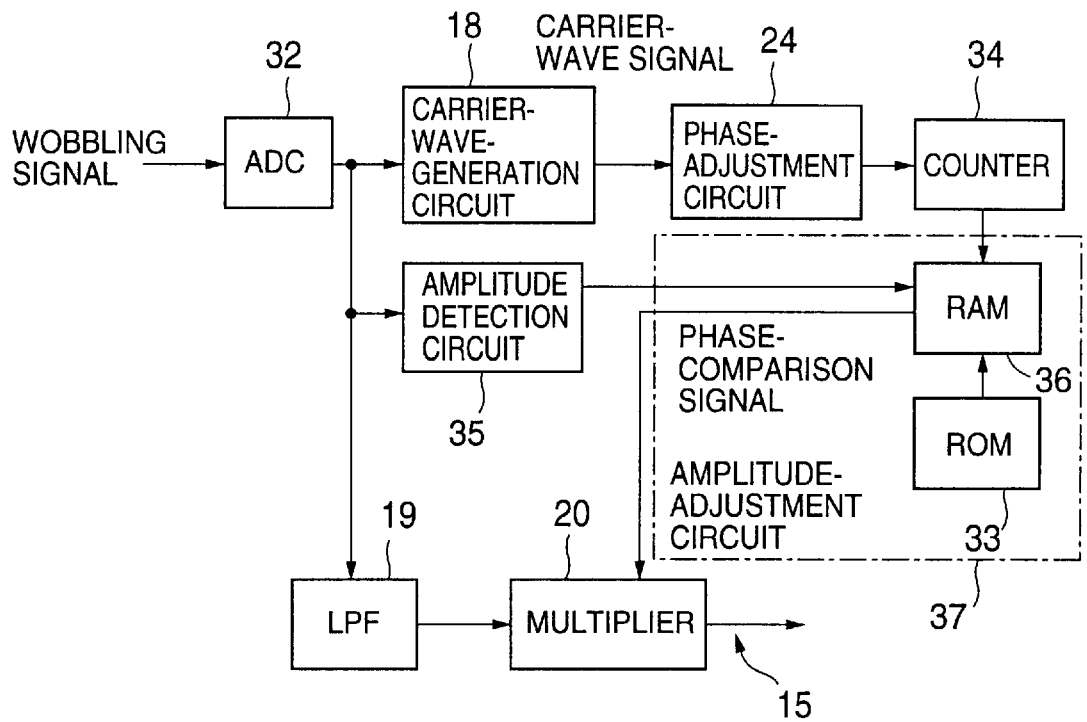
FIG. 9 is a block diagram of a circuit configuration that controls amplitude of a phase-comparison signal based on the amplitude of the wobbling signal.

FIG. 9 is a block diagram of a circuit configuration that controls the amplitude of a phase-comparison signal based on the amplitude of the wobbling signal.

In FIG. 9, the wobbling signal is digitized by an ADC (analog-digital converter) circuit 32. In the same manner as was previously described, the carrier-wave-generation circuit 18 generates a carrier-wave signal. The carrier-wave signal may be generated from the binarized wobbling signal instead of generated from an output of the ADC 32. In this case, the carrier-wave signal becomes a binarized signal because it is generated by digital circuits.

In order to output a sine wave reflecting the wobbling signal as a phase-comparison signal, data of the sine wave is stored in a ROM 33. In general, the data stored in the ROM 33 is output therefrom at timings controlled by the output of the phase-adjustment circuit 24 and an output of a counter 34. The digital wobbling signal and phase-comparison signal generated in this manner are used by the multiplier 20 or the subtraction unit 26 to detect a phase error. In this embodiment, the amplitude of the wobbling signal is detected by an amplitude-detection circuit 35 by checking data acquired by the ADC 32, thereby measuring a gap between the detected amplitude and the predetermined target amplitude. The gap is used as a gain by which the data of the ROM 33 is multiplied, and the results of multiplication are stored in a RAM 36. Then, the data stored in the RAM 36 are used as a phase-comparison signal. The ROM 33 and the RAM 36 together form an amplitude-adjustment circuit 37. When the phase-adjustment circuit 24 has the amplitude-adjustment circuit 37 generate the phase-comparison signal based on the carrier-wave signal so as to introduce a 0° or 90° phase displacement, the digital configuration as shown in FIG. 9 can easily adjust the phase of the signal by changing a start address of the counter 34.

In the following, a fourth embodiment of the first principle of the present invention will be described with reference to FIG. 10 and FIG. 11.

Figure 3:
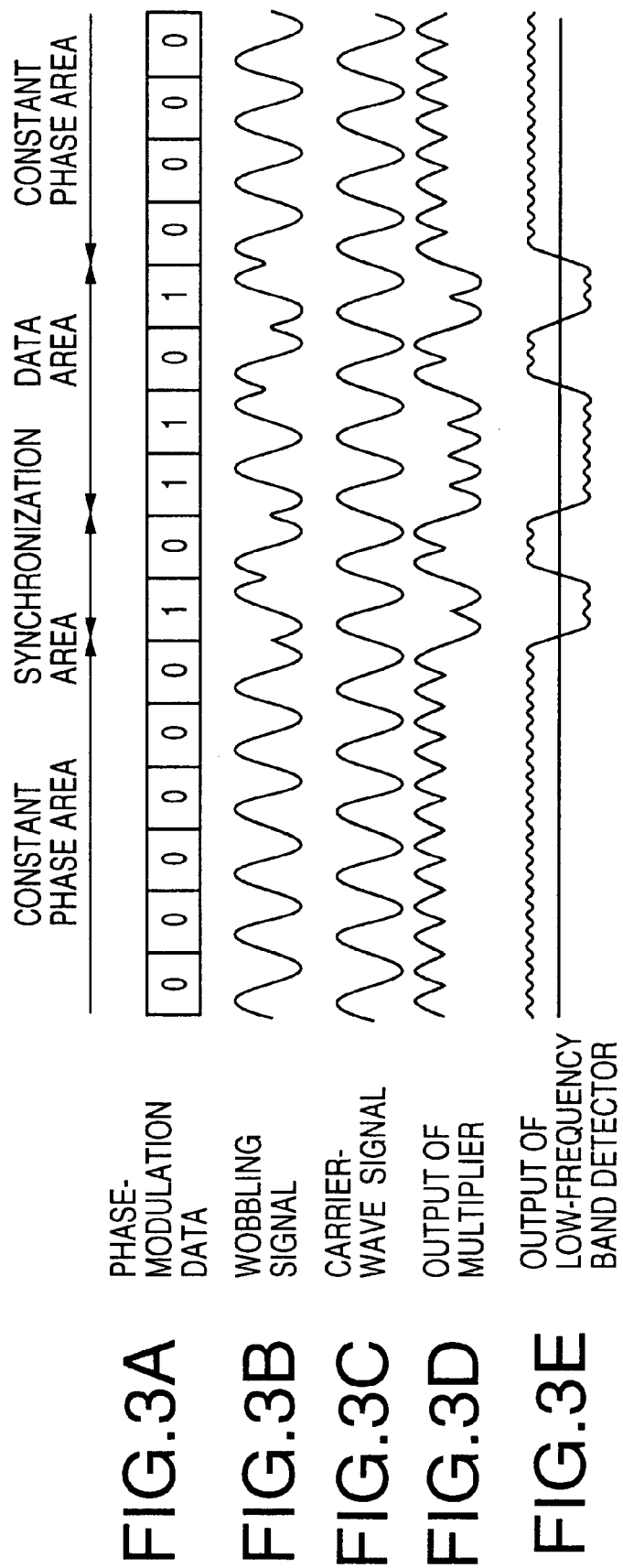
FIGS. 3A through 3E are charts showing signal waveforms relating to demodulation operation.

A phase-modulation format is generally comprised of a synchronization area including a special pattern for establishing synchronization, a data area including address information, and a constant-phase area used for capturing a carrier-wave signal (see FIG. 3A). Among these areas, the data area may not easily benefit from the present invention since phase-modulation data in this area is difficult to predict.

Figure 10:
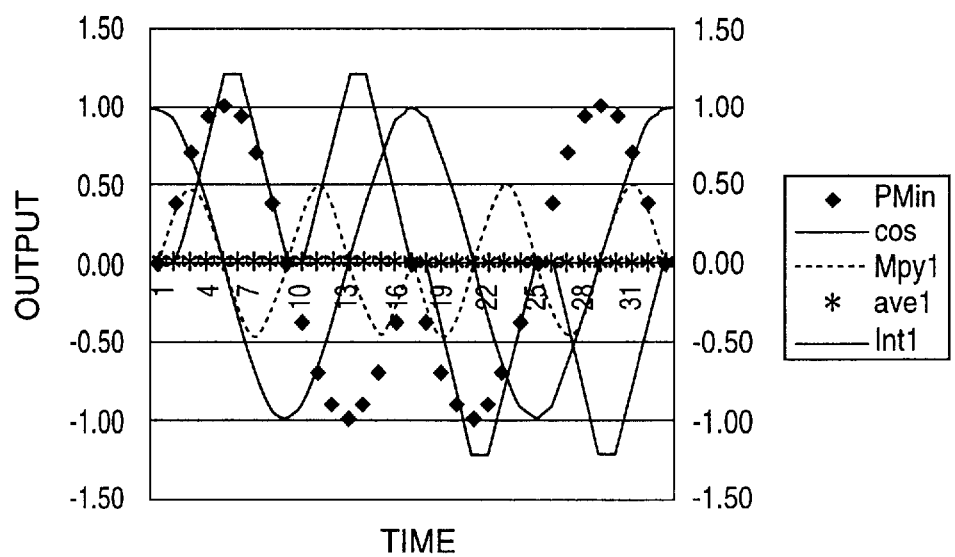
FIG. 10 is a chart showing signal waveforms at a point of phase change where no phase error is present.

FIG. 10 is a chart showing signal waveforms at a point of phase change where no phase error is present. FIG. 11 is a chart showing signal waveforms at a point of phase change where a phase error is present.

Figure 11:
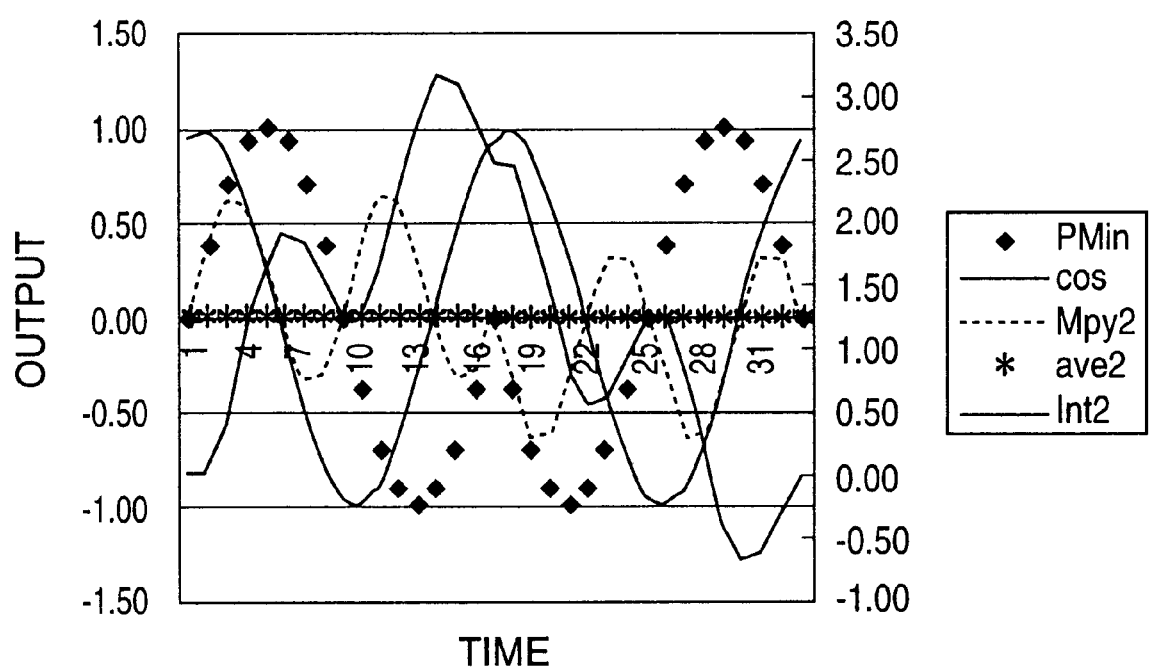
FIG. 11 is a chart showing signal waveforms at a point of phase change where a phase error is present.

A wobble observed during the first half of the period illustrated in FIG. 10 or FIG. 11 is the same as that of the second embodiment in terms of phase relations between signals. During a wobble of the second half, however, a signal PMin having a 180° phase difference with the carrier-wave signal is input, so that totally opposite characteristics are observed with respect to the phase-difference detection. Because of this, the signal ave becomes zero irrespective of the presence of a phase error. Although the signals Int attain the same level at the end of the second wobble regardless of the presence of phase error, the lower-frequency components of the signal Int (e.g., an average of the signal) becomes positive, which indicates that the phase error has been detected. This is the same in the second embodiment of the present invention.

Since the detected phase has correlation with the phase-modulated data, it is necessary to be able to predict a phase at a detection point in order to employ the present invention. Since a pattern can be predicted during the synchronization area, as described in connection with FIG. 10 and FIG. 11, it is possible to detect a phase error by use of the low-frequency-band detector 23 or the like for detecting low-frequency components of the signal Int as long as two wobbles situated around a point of phase change are concerned. Yet, detecting a phase error during the constant-phase area is the simplest way, and guarantees a certain level of accuracy.

In the following, a second principle of the present invention will be described with reference to the accompanying drawings.

Figure 12:
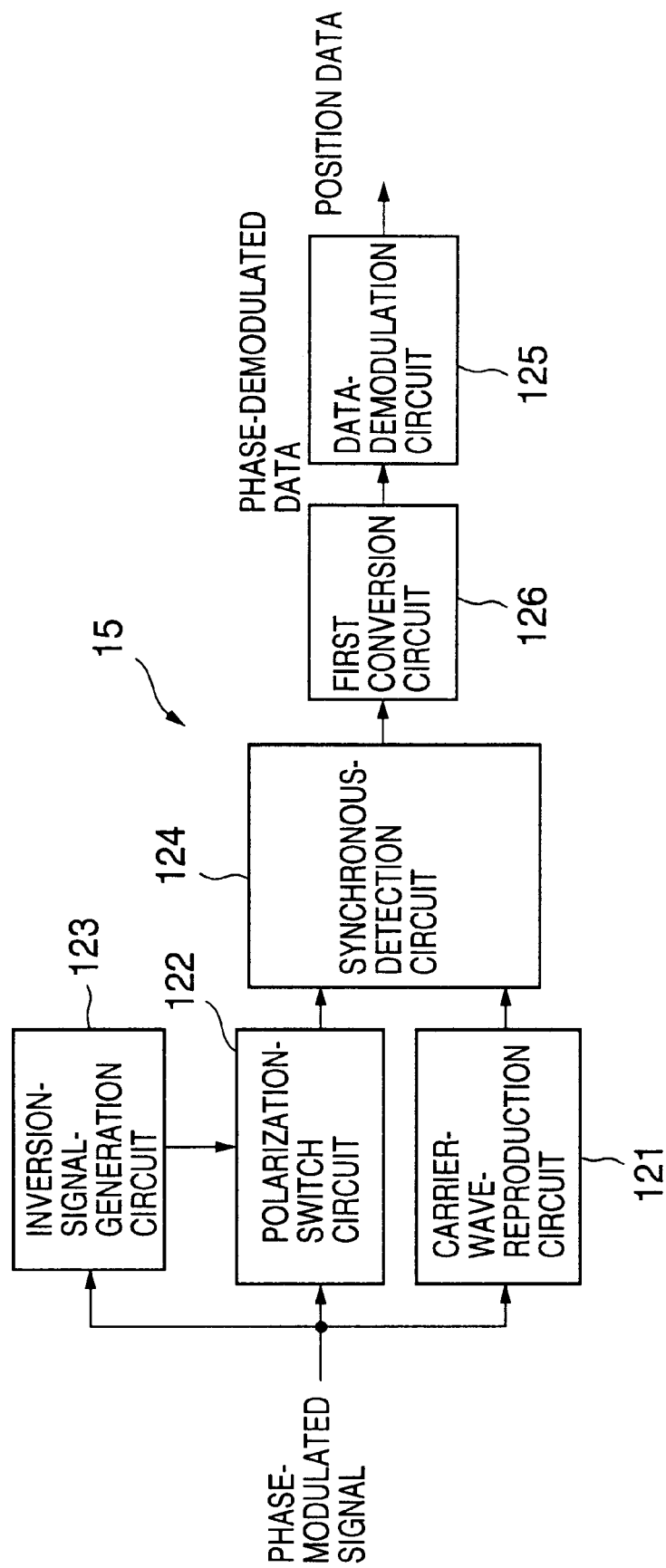
FIG. 12 is a block diagram of the demodulation circuit according to a first embodiment of a second principle of the present invention.

FIG. 12 is a block diagram of the demodulation circuit 15 according to a first embodiment of a second principle of the present invention. FIGS. 13A through 13F are charts showing signal waveforms relating to demodulation operation. FIGS. 14A through 14F are also charts showing signal waveforms relating to demodulation operation.

A carrier-wave-reproduction circuit 121 generates a carrier-wave signal having a reference phase based on the phase-modulated signal detected from the medium 7. The phase-modulated signal is also supplied to a polarization-switch circuit 122, which changes the polarization of the phase-modulated signal according to an output signal supplied from an inversion-signal-generation circuit 123. A synchronous-detection circuit 124 detects a phase difference between the carrier-wave signal and the output of the polarization-switch circuit 122. In the BPSK scheme to which this embodiment is directed, possible phase states include only 0° and 180°, so that the output of the synchronous-detection circuit 124 assumes only two statuses, i.e., 0 and 1. When the inversion signal from the inversion-signal-generation circuit 123 is not supplied to the polarization-switch circuit 122, signals as shown in FIGS. 13A through 13F are observed. As shown in these figures, the phase-modulation data recorded in the medium 7 is output from the synchronous-detection circuit 124 without any change. This signal is binarized (may be supplied to a low-pass filter in some cases) to generate the phase-modulation data. Further, the data-demodulation circuit 125 demodulates the data in order to obtain position data that is the original information before it was phase-modulated. The polarization-switch circuit 122 is part of the characteristic features of this embodiment, and a configuration without the polarization-switch circuit 122 is referred to as a related-art configuration for the sake of explanation.

Figure 13:
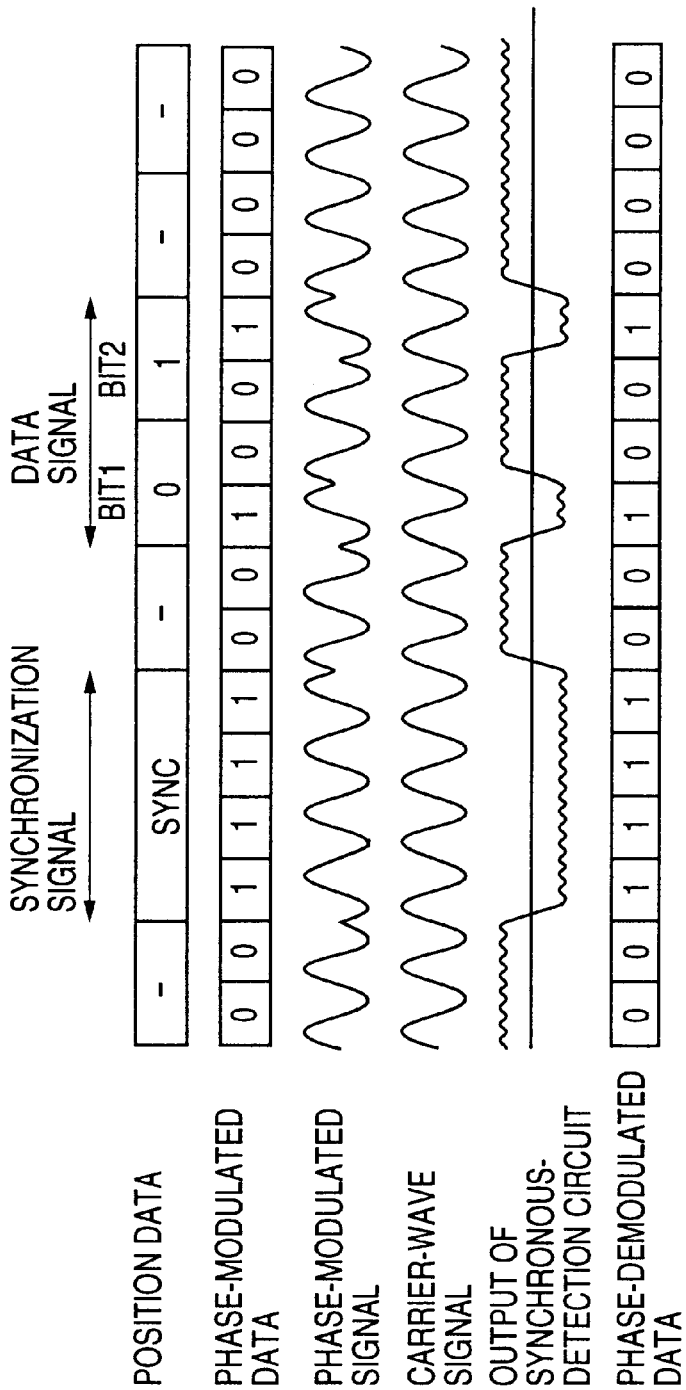
FIGS. 13A through 13F are charts showing signal waveforms relating to demodulation operation.
Figure 14:
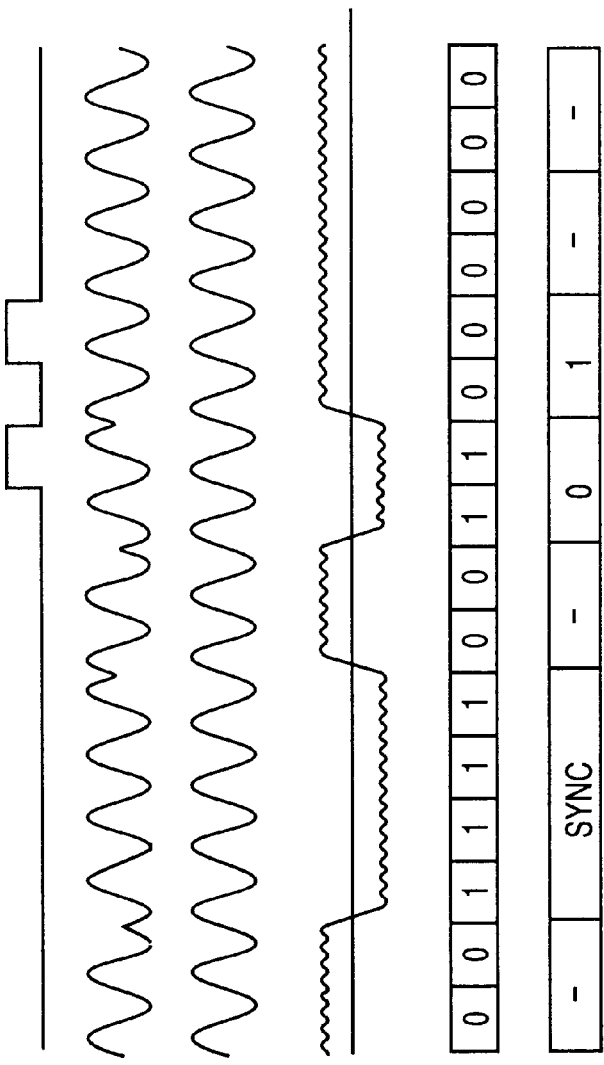
FIGS. 14A through 14F are also charts showing signal waveforms relating to demodulation operation.

This embodiment employs a phase-modulation scheme that forms a unit of information by including both a normal phase portion and a reversed phase portion within the unit. Namely, as shown in FIGS. 13A through 13C, a unit (BIT) of information for position data is comprised of two carrier-wave cycles having opposite phases, and BIT1 is represented as 1&0 while BIT2 is represented as 0&1. For example, the position data 0 is converted into a wobble combination 1&0 by using two carrier-wave cycles at the time of modulating wobble information. In the related-art demodulation scheme, as described above, the output of the synchronous-detection circuit 124 has a signal level thereof changing by a unit of one carrier-wave cycle, thereby necessitating a circuit of high operation speed. Further, such a circuit requires signals of a high S/N ratio when considering tolerance levels for detection errors.

When the polarization-switch circuit 122 is used in this embodiment of the present invention, signals as shown in FIGS. 14A through 14F are observed. In these figures, the inversion signal is generated at timings indicative of a predetermined one of a pre-phase-change portion and a post-phase-change portion within the unit of information unit during the data-signal period. The polarization-switch circuit 122 inverts the phase-modulated signal at the timings indicated by the inversion signal. The synchronous-detection circuit 124 obtains an output thereof by comparing the output of the polarization-switch circuit 122 and the phase of the carrier-wave signal. As is apparent from inspection of the output of the synchronous-detection circuit 124, this output signal changes a signal level thereof by a unit of two carrier-wave cycles minimum. Since one BIT of position data is converted into 0&0 if it is 1, and is converted into 1&1 if it is 0, the detection circuit does not have to be as fast as in the related-art demodulation scheme, and the S/N ratio of the signal does not have to be as high.

Use of the inversion signal, however, necessitates use of simple conversion rules between the phase-modulation data represented by the wobbles and the output of the synchronous-detection circuit 124. In this embodiment, therefore, a first conversion circuit 126 is provided for the purpose of applying conversion that are reverse to the inversion of the phase-modulated signal, and recovers the data that was inverted by the polarization-switch circuit 122. The first conversion circuit 126 operates only when the signal is inverted. It should be noted that the first conversion circuit 126 does not have to be provided as a separate circuit unit, and may be implemented as part of the data demodulation circuit 125. Further, although this embodiment has been described with reference to a case in which the inversion operation is applied to the data period, this embodiment can be applicable to a special signal such as a signal that is provided during the synchronization-signal period.

Figure 15:
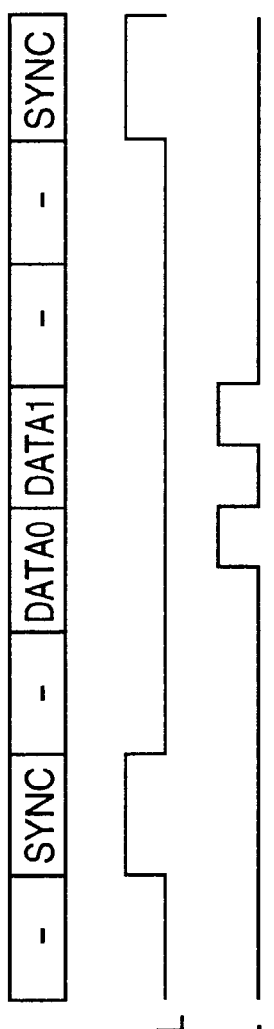
FIGS. 15A through 15C are charts for explaining the first embodiment of the second principle of the present invention.

FIGS. 15A through 15C are charts for explaining the first embodiment according the second principle of the present invention.

As shown in FIG. 15A, position data generally includes a synchronization signal Sync and a data signal Data. With regard to the data signal, it is necessary to be able to distinguish at least two different patterns. With regard to the synchronization signal, however, checking presence/absence of the synchronization signal is all that is necessary. In order to insure straightforward detection without a need for any special operation, the synchronization signal is provided as a special pattern that is easy to detect. In any format, further, positions of data signals are fixed relative to the position of the synchronization signal. If the synchronization signal is detected without inversion of the signal as shown in FIG. 15B, and the inversion signal is generated at timings measured from the reference timing of the synchronization signal as shown in FIG. 15C, it is possible to match the timings of the inversion signal with a predetermined one of the pre-phase-change portion and the post-phase-change portion of the information units appearing in the data signal.

In this manner, this embodiment obtains phase-modulation data by inverting the phase-modulated signal at timings indicative of a predetermined one of the pre-phase-change portion and the post-phase-change portion within information units, so that performance requirements for the demodulation circuit 15 are not so high in terms of operation speed of the circuit for detecting phase reversals, robustness against noises caused by synchronization demodulation around phase-change points, and a capability to cope with a decrease in signal magnitude. This allows a demodulation circuit to be made in a simple design and to be reliable. Further, the data obtained by inverting the phase-modulated signal is converted into the original data, thereby eliminating a need to change the established modulation rules that are applied to position data recorded in the medium 7. Further, since the inversion signal is generated by using the synchronization signal as a reference, use or non-use of the demodulation circuit 15 can be defined with respect to each area on the medium 7. This configuration makes it possible to select whether to use the inversion signal in areas that require high levels of reliability or whether to use the inversion signal for special signals that do not include phase-reversed portions. If the demodulation circuit 15 is not used for its inversion function, the demodulation circuit 15 operates as an ordinary demodulation circuit, so that selection between use and non-use thereof can be easily made. Further, use of the demodulation circuit 15 makes it possible to make an information recording/reproducing device that is inexpensive and reliable.

Figure 16:
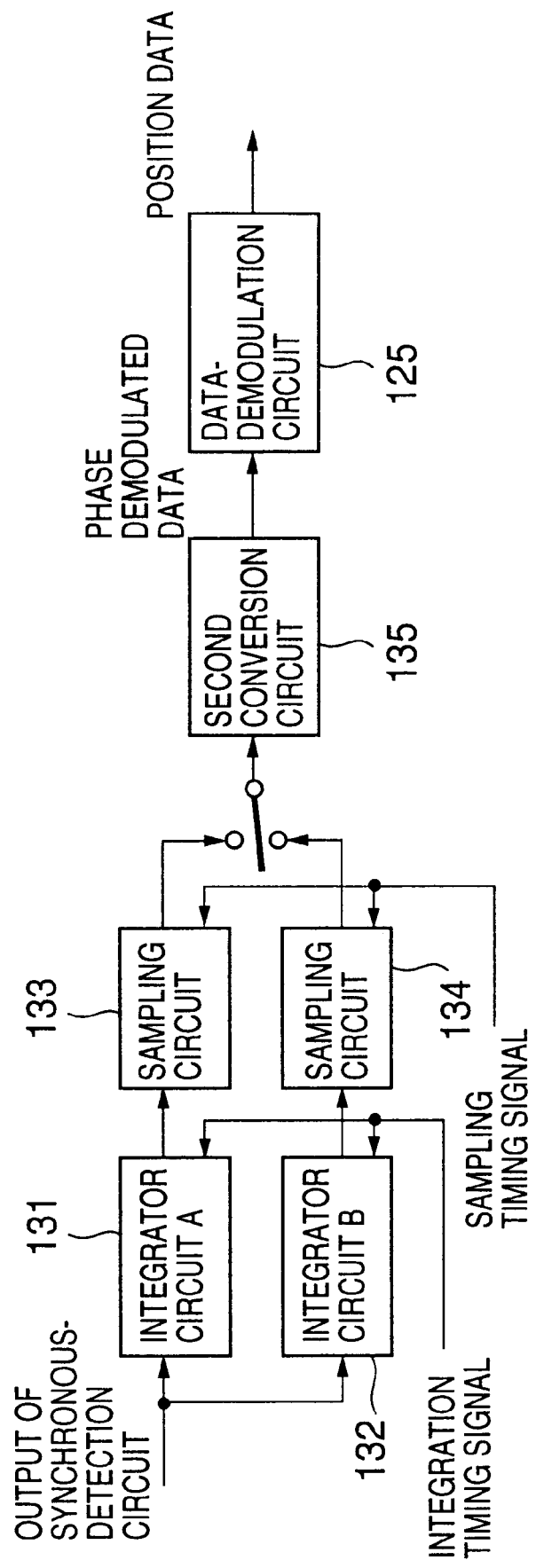
FIG. 16 is a block diagram of a demodulation circuit according to a second embodiment of the second principle of the present invention.

In the following, a second embodiment of the second principle of the present invention will be described with reference to FIG. 16. In FIG. 16, the same elements as those of the first embodiment are referred to by the same numerals, and a description thereof will be omitted.

In the second embodiment of the second principle of the present invention, a configuration shown in FIG. 16 uses an output of a synchronous-detection circuit as an input thereto. Processing stages prior to the synchronous-detection circuit are the same as those of the related-art modulation scheme. The output of the synchronous-detection circuit is supplied to a plurality of integrator circuits 131 and 132, the number of which is two in this particular example. Output signals of the integrator circuits 131 and 132 are supplied to sampling circuits 133 and 134, respectively, where the signals are sampled at specific timings, and are held constant at the sampled values. Outputs of the sampling circuits 133 and 134 are successively selected to produce phase-demodulated data. In the same manner as in the first embodiment, the data demodulation circuit 125 generates position data from the phase-demodulated data. If the integration operation and the sampling operation are performed once in every carrier-wave cycle, a second conversion circuit 135 shown in FIG. 16 is unnecessary.

FIGS. 17A through 17K are charts showing signal waveforms according to the second embodiment of the second principle.

FIGS. 17A through 17K show a case in which the integrator circuits 131 and 132 and the sampling circuits 133 and 134 are switched to operate in turn at every carrier-wave cycle. The output of the synchronous-detection circuit is integrated over different time periods by the integrator circuits 131 and 132. At an end of integration for one carrier-wave cycle, the sampling circuits 133 and 134 sample the respective integrated values, and hold the outputs thereof constant at the sampled values. The outputs of the sampling circuits 133 and 134 are selected in turn at every carrier-wave cycle, thereby producing a phase-demodulated signal having a large amplitude that reflects results of all the successive phase comparisons. Since the integration operation is involved, the phase-demodulated data is obtained with a delay of one carrier-wave cycle. The integration operation and the sampling operation are repeated every carrier-wave cycle as shown in FIGS. 17A through 17K.

Each of the integrator circuits 131 and 132 is preferably reset by the time a next operation starts. The above description has been provided with reference to a configuration in which the integrator circuit and the sampling circuit are provided as a pair. It should be noted, however, that outputs of a plurality of integrator circuits are sampled by a single sampling circuit. Using a single set of an integrator circuit and a sampling circuit is well known in the art. In the case of such a single set, however, results of all the phase comparisons cannot be utilized or outputs become unstable because the integration operation needs to stop during the sampling period of the sampling circuit or the sampling operation needs to be performed concurrently with the integration operation. As an example of another approach, there is a method that does not use an integrator circuit, such as that disclosed in Japanese Patent No. 6-19898. Such a method, however, simply directs the output signal of the synchronous-detection circuit to a low-pass filter, thereby achieving only a small S/N ratio, and, thus, is not suitable for high-speed demodulation. In this embodiment of the present invention, the integrator circuits 131 and 132 are used for integrating phase-comparison results, and are switched successively to reflect results of every consecutive phase comparison, thereby producing a demodulated signal having a high S/N ratio. Further, use of the configuration of this embodiment makes it possible to demodulate a phase-modulated signal without any difficulties even if phases are changed carrier-wave cycle by carrier-wave cycle.

In this manner, the integrator circuits 131 and 132 and the sampling circuits 133 and 134 operate in turn to continuously integrate and sample the results of phase comparison, which is made between the phase-modulated signal and the carrier-wave signal, thereby generating phase-demodulated data. This configuration makes it possible to detect the phase-modulation data under desirable conditions of S/N ratios, and, also, enables the integrator circuits 131 and 132 to secure a sufficient discharge time.

FIGS. 18A through 18K are charts showing signal waveforms according to a variation of the second embodiment of the second principle.

In general, the integration operation and the sampling operation are performed for a time period that is a multiple of the carrier-wave cycle. In the example of FIGS. 17A through 17K, this time period is equal to the carrier-wave cycle. In this case, the phase-demodulated data is obtained with only a delay of one carrier-wave cycle. Although the SIN ratio is sufficient because of the integration operation, a further improvement in the S/N ratio is desirable if the phase-modulated signal has significantly degraded quality such as in the case of a wobble signal recorded in a pre-recorded area and having a superimposed reproduced signal. For the purpose of further improving the S/N ratio, the integration operation for integrating a phase-comparison result may be extended to two or more times the carrier-wave cycle. FIGS. 18A through 18K show a case in which an integration operation is performed for three consecutive carrier-wave cycles. During the extended integration operation, data that is obtained by sampling an output of another integrator circuit is held as an output. Because of a need for a special integration timing and a sampling timing, this method requires that the data area be positioned at a special location, and that the result of phase comparison stays at the same polarization for the extended period of integration operation. Nonetheless, this method can draw on the high S/N ratio.

When the integration and sampling timings are changed as described above, however, the phase-demodulated data that is output from the demodulation circuit 15 according to this embodiment differs from the phase-modulation data recorded in the medium 7, and certain conversion rules control the difference. When the integration operation extends three carrier-wave cycles as shown in FIGS. 18A through 18K, for example, '010001' is converted into '011101'. In order to convert the phase-demodulated data into the correct phase-modulation data, a second conversion circuit 135 is provided for the purpose of applying conversion rules that will reverse the effect of the change in the integration timing and the sampling timing. The second conversion circuit 135 may be implemented as part of the data-demodulation circuit 125.

Analogous to the previous embodiment described in connection with FIGS. 15A through 15C, the synchronization signal may be detected in this embodiment, and is used as a reference to indicate integration timings and sampling timings that are fixed relative to the timing of the synchronization signal. Further, a data area that requires a high S/N ratio and has no reversed phases may be identified, and a signal having a different duration may be generated only during this data area.

Further, use of the demodulation circuit 15 according to the second embodiment of the second principle makes it possible to make an information recording/reproducing device that is inexpensive and reliable.

Figure 19:
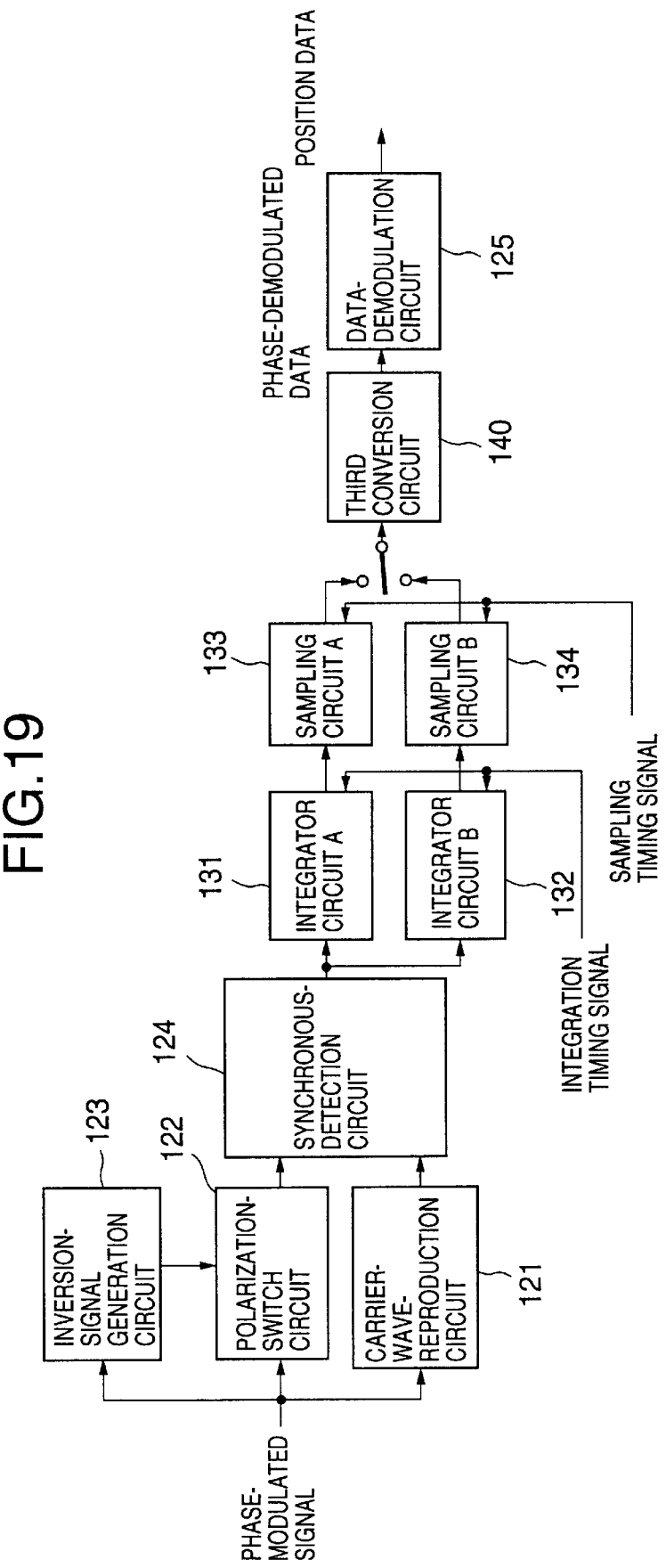
FIG. 19 is a block diagram of a demodulation circuit according to a third embodiment of the second principle of the present invention.

FIG. 19 is a block diagram of a demodulation circuit according to a third embodiment of the second principle of the present invention. In FIG. 19, the same elements as those of FIG. 12 and FIG. 16 are referred to by the same numerals, and a description thereof will be omitted. FIGS. 20A through 20I are charts showing signal waveforms for explaining the third embodiment of the second principle of the present invention.

In the third embodiment, as shown in FIG. 19, the configuration of FIG. 12 is combined with the configuration of FIG. 16, such that the output of the synchronous-detection circuit 124 is input to the integrator circuits 131 and 132. The effect of combining the first and second embodiments in this manner are manifest in FIGS. 20A through 20I. FIGS. 20A through 20I show a case in which a minimum unit (BIT) of data included in the position data is made of four carrier-wave cycles where phase modulation is '0011' when BIT is zero, and is '1100' when BIT is one. In FIG. 20A, an example of BIT being equal to 0 is shown.

Since a data portion is phase-modulated by a unit of four carrier-wave cycles in which two cycles have an opposite phase to the other two cycles, an inversion signal is generated from a synchronization signal such as to indicate a predetermined one of the pre-phase-change portion and the post-phase-change portion within the unit of information in the data portion. Based on the inversion signal, the synchronous-detection circuit 124 detects a phase difference between the carrier-wave signal derived from the phase-demodulated signal and the phase-modulated signal inverted by the polarization-switch circuit 122 in response to the inversion signal. In this example, the phase-modulation data is '0100110'. Because of the signal inversion, however, the output signal of the synchronous-detection circuit 124 is '0100000'. This output signal is integrated in turn by the integrator circuits 131 and 132 over four consecutive carrier-wave cycles in each turn, rather than being integrated and sampled over a single carrier-wave cycle in each turn. Integration of electrical voltage over the period of four carrier-wave cycles achieves a high voltage, thereby insuring a high S/N ratio. The phase-demodulated signal in this example is '0111100'. In comparison with '0011' representing BIT 0 of the phase-modulation data, the phase-demodulated signal is represented as 'xxx0', where x indicates data that changes depending on the immediately preceding data, and 0 indicates a sum. In this embodiment, a third conversion circuit 140 is provided for the purpose of reversing the effect of data conversion that is caused by the inversion of the phase-modulated signal and the change of integration and sampling timings. It should be noted that the third conversion circuit 140 is of a smaller size than the first conversion circuit 126 and the second conversion circuit 135 combined, because the third conversion circuit 140 can streamline conversion rules when combining the two sets of conversion rules. Obviously, the third conversion circuit 140 can be implemented as an integral part of the data-demodulation circuit 125.

The third embodiment combines the first and second embodiments, so that it can draw on advantages of both embodiments. Further, the third embodiment eliminates a phase change within an information unit by inverting the phase-modulated signal, and integrates results of phase comparison, thereby attaining a high S/N ratio. Selective use of a plurality of integrator circuits in turn makes it possible to insure a sufficient discharge time. Moreover, the third conversion circuit reverses the effect of data conversion that is introduced by inverting the polarization of the phase-modulated signal and introduced by changing the integration and sampling timings intermittently, so that the single circuit can achieve the function of a plurality of circuits. Further, use of the demodulation circuit according to the third embodiment of the second principle makes it possible to make an information recording/reproducing device that is inexpensive and reliable.

Further, the present invention is not limited to these embodiments, but various variations and modifications may be made without departing from the scope of the present invention.

The present application is based on Japanese priority applications no. 11-220648 filed on Aug. 4, 1999 and no. 11-310995 filed on Nov. 1, 1999, with the Japanese Patent Office, the entire contents of which are hereby incorporated by reference.

What is claimed is:

1. A device for demodulating position information that is recorded as track wobbling in a record medium by a BPSK (binary phase-shift keying) scheme, comprising:
   a carrier-wave-generation circuit which derives a carrier wave from a wobbling signal obtained from the record medium;
   a phase-adjustment circuit which generates a phase-comparison signal having a 90° phase difference relative to the carrier wave;
   a multiplier which multiplies the wobbling signal and the phase-comparison signal to supply a product signal; and
   a detection circuit which detects a phase error of the carrier wave introduced by said carrier-wave-generation circuit by detecting the phase error between the wobbling signal and the phase-comparison signal based on the product signal.

2. The device as claimed in claim 1, wherein said detection circuit includes a low-frequency-band-detection circuit which detects low-frequency components of the product signal to detect the phase error between the wobbling signal and the phase-comparison signal.

3. The device as claimed in claim 1, wherein said detection circuit includes an integrator circuit which integrates the product signal over a time period to detect the phase error between the wobbling signal and the phase-comparison signal.

4. The device as claimed in claim 1, further comprising:
an amplitude-detection circuit which detects an amplitude of the wobbling signal; and
an amplitude-adjustment circuit which adjusts an amplitude of the phase-comparison signal according to the detected amplitude of the wobbling signal so as to attain a target amplitude.

5. The device as claimed in claim 1, wherein the phase error is detected during a predetermined area of the wobbling signal where the predetermined area is defined by a wobble phase-modulation format.

6. The device as claimed in claim 1, wherein the phase error is detected during a predetermined area of the wobbling signal where the predetermined area is defined by a wobble phase-modulation format as an area having no phase change.

7. The device as claimed in claim 1, wherein said phase-adjustment circuit adjusts the phase error to zero.

8. A device for demodulating position information that is recorded as track wobbling in a record medium by a BPSK scheme, comprising:
a carrier-wave-generation circuit which derives a carrier wave from a wobbling signal obtained from the record medium;
a phase-adjustment circuit which generates a phase-comparison signal having no phase difference relative to the carrier wave;
a subtraction circuit which obtains a difference between the wobbling signal and the phase-comparison signal to supply a difference signal; and
a detection circuit which detects a phase error of the carrier wave introduced by said carrier-wave-generation circuit by detecting the phase error between the wobbling signal and the phase-comparison signal based the difference signal.

9. The device as claimed in claim 8, further comprising a selection-signal-generation circuit which generates a selection signal indicative of whether a slope of the phase-comparison signal is positive or negative, wherein said detection circuit disregards the difference signal during a period when the selection signal indicates that the slope of the phase-comparison signal is a predetermined one of a negative slope and a positive slope.

10. The device as claimed in claim 9, wherein said detection circuit includes an integrator circuit which integrates the partially disregarded difference signal over a time period to detect the phase error between the wobbling signal and the phase-comparison signal.

11. The device as claimed in claim 8, further comprising a selection-signal-generation circuit which generates a selection signal indicative of whether a slope of the phase-comparison signal is positive or negative, wherein said detection circuit includes a circuit which inverts the difference signal during a period when the selection signal indicates that the slope of the phase-comparison signal is a predetermined one of a negative slope and a positive slope.

12. The device as claimed in claim 11, wherein said detection circuit includes an integrator circuit which integrates the partially inverted difference signal over a time period to detect the phase error between the wobbling signal and the phase-comparison signal.

13. The device as claimed in claim 8, wherein the wobbling signal is controlled to a fixed amplitude.

14. The device as claimed in claim 8, wherein the phase error is detected during a predetermined area of the wobbling signal where the predetermined area is defined by a wobble phase-modulation format.

15. The device as claimed in claim 8, wherein the phase error is detected during a predetermined area of the wobbling signal where the predetermined area is defined by a wobble phase-modulation format as an area having no phase change.

16. The device as claimed in claim 8, wherein said phase-adjustment circuit adjusts the phase error to zero.

17. A device for recording and reproducing information in and from a record medium, comprising:
a light-beam source for emitting a light beam;
a drive mechanism driven based on position data to move the light beam to an intended position; and
a demodulation unit which demodulates the position data that is recorded as track wobbling in a record medium by a BPSK scheme, wherein said demodulation unit includes:
a carrier-wave-generation circuit which derives a carrier wave from a wobbling signal obtained from the record medium;
a phase-adjustment circuit which generates a phase-comparison signal having a 90° phase difference relative to the carrier wave;
a multiplier which multiplies the wobbling signal and the phase-comparison signal to supply a product signal; and
a detection circuit which detects a phase error of the carrier wave introduced by said carrier-wave-generation circuit by detecting the phase error between the wobbling signal and the phase-comparison signal based on the product signal.

18. A device for recording and reproducing information in and from a record medium, comprising:
a light-beam source for emitting a light beam;
a drive mechanism driven based on position data to move the light beam to an intended position; and
a demodulation unit which demodulates the position data that is recorded as track wobbling in a record medium by a BPSK scheme, wherein said demodulation unit includes:
a carrier-wave-generation circuit which derives a carrier wave from a wobbling signal obtained from the record medium;
a phase-adjustment circuit which generates a phase-comparison signal having no phase difference relative to the carrier wave;
a subtraction circuit which obtains a difference between the wobbling signal and the phase-comparison signal to supply a difference signal; and
a detection circuit which detects a phase error of the carrier wave introduced by said carrier-wave-generation circuit by detecting the phase error between the wobbling signal and the phase-comparison signal based the difference signal.

19. A device for demodulating position information that is recorded as track wobbling in a record medium by a BPSK scheme wherein a wobbling signal obtained from the record medium has a unit information thereof represented by a pair of a pre-phase-change portion and a post-phase-change portion, comprising:
- a carrier-wave-generation circuit which derives a carrier wave from the wobbling signal;
- an inversion-signal-generation circuit which generates an inversion signal indicative of a timing of a predetermined one of the pre-phase-change portion and the post-phase-change portion;
- a polarization-switch circuit which reverses a phase of the wobbling signal at the timing indicated by the inversion signal to generate a partially phase reversed wobbling signal;
- a synchronous-detection circuit which demodulates the partially phase reversed wobbling signal by comparing phases between the carrier wave and the partially phase reversed wobbling signal; and
- a data-demodulation circuit which demodulates the position information from an output of said synchronous-detection circuit.

20. The device as claimed in claim 19, wherein the data-modulation circuit comprises a conversion circuit that converts the output of said synchronous-detection circuit to offset an effect of the phase reversal made by said polarization-switch circuit.

21. The device as claimed in claim 19, wherein the wobbling signal includes a synchronization signal for synchronization purposes and data signals for representing the position information, and said inversion-signal-generation circuit generates the inversion signal by identifying a predetermined timing with reference to a timing of the synchronization signal.

22. A device for demodulating position information that is recorded as track wobbling in a record medium by a BPSK scheme, comprising:
- a carrier-wave-generation circuit which derives a carrier wave from a wobbling signal obtained from the record medium;
- a synchronous-detection circuit which demodulates the wobbling signal by comparing phases between the carrier wave and the wobbling signal;
- a plurality of integrator circuits which integrate an output of said synchronous-detection circuit over respective predetermined time periods;
- at least one sampling circuit which samples outputs of said integrator circuits successively; and
- a data-demodulation circuit which demodulates the position information from an output of said at least one sampling circuit.

23. The device as claimed in claim 22, wherein the respective predetermined time periods are a multiple of one cycle of the carrier wave, and are variable.

24. The device as claimed in claim 22, wherein the wobbling signal includes a synchronization signal for synchronization purposes and data signals for representing the position information, and said plurality of integrator circuits and said at least one sample circuit operate with reference to a timing of the synchronization signal.

25. The device as claimed in claim 22, wherein said data-demodulation circuit comprises a conversion circuit that converts the output of said at least one sampling circuit to offset an effect of changes of the respective predetermined time periods.

26. A device for demodulating position information that is recorded as track wobbling in a record medium by a BPSK scheme wherein a wobbling signal obtained from the record medium has a unit information thereof represented by a pair of a pre-phase-change portion and a post-phase-change portion, comprising:
- a carrier-wave-generation circuit which derives a carrier wave from the wobbling signal;
- an inversion-signal-generation circuit which generates an inversion signal indicative of a timing of a predetermined one of the pre-phase-change portion and the post-phase-change portion;
- a polarization-switch circuit which reverses a phase of the wobbling signal at the timing indicated by the inversion signal to generate a partially phase reversed wobbling signal;
- a synchronous-detection circuit which demodulates the partially phase reversed wobbling signal by comparing phases between the carrier wave and the partially phase reversed wobbling signal;
- a plurality of integrator circuits which integrate an output of said synchronous-detection circuit over respective predetermined time periods;
- at least one sampling circuit which samples outputs of said integrator circuits successively; and
- a data-demodulation circuit which demodulates the position information from an output of said at least one sampling circuit.

27. The device as claimed in claim 26, wherein the data-modulation circuit comprises a conversion circuit that converts the output of said at least one sampling circuit to offset an effect of the phase reversal made by said polarization-switch circuit and an effect of changes of the respective predetermined time periods.

28. A device for recording and reproducing information in and from a record medium, comprising:
- a light-beam source for emitting a light beam;
- a drive mechanism driven based on position data to move the light beam to an intended position; and
- a demodulation unit for demodulating the position data that is recorded as track wobbling in the record medium by a BPSK scheme wherein a wobbling signal obtained from the record medium has a unit information thereof represented by a pair of a pre-phase-change portion and a post-phase-change portion, wherein said demodulation unit includes:
  - a carrier-wave-generation circuit which derives a carrier wave from the wobbling signal;
  - an inversion-signal-generation circuit which generates an inversion signal indicative of a timing of a predetermined one of the pre-phase-change portion and the post-phase-change portion;
  - a polarization-switch circuit which reverses a phase of the wobbling signal at the timing indicated by the inversion signal to generate a partially phase reversed wobbling signal;
  - a synchronous-detection circuit which demodulates the partially phase reversed wobbling signal by comparing phases between the carrier wave and the partially phase reversed wobbling signal; and
  - a data-demodulation circuit which demodulates the position data from an output of said synchronous-detection circuit.

29. A device for recording and reproducing information in and from a record medium, comprising:
- a light-beam source for emitting a light beam;
- a drive mechanism driven based on position data to move the light beam to an intended position; and a demodulation unit for demodulating position data that is recorded as track wobbling in the record medium by a BPSK scheme, wherein said demodulation unit includes:
  a carrier-wave-generation circuit which derives a carrier wave from a wobbling signal obtained from the record medium;
  a synchronous-detection circuit which demodulates the wobbling signal by comparing phases between the carrier wave and the wobbling signal;
  a plurality of integrator circuits which integrate an output of said synchronous-detection circuit over respective predetermined time periods;
  at least one sampling circuit which samples outputs of said integrator circuits successively; and
  a data-demodulation circuit which demodulates the position data from an output of said at least one sampling circuit.

* * * * *